KELLY & FRANKLIN.
Fanning Mill.
No. 40,937. Patented Dec. 15, 1863.
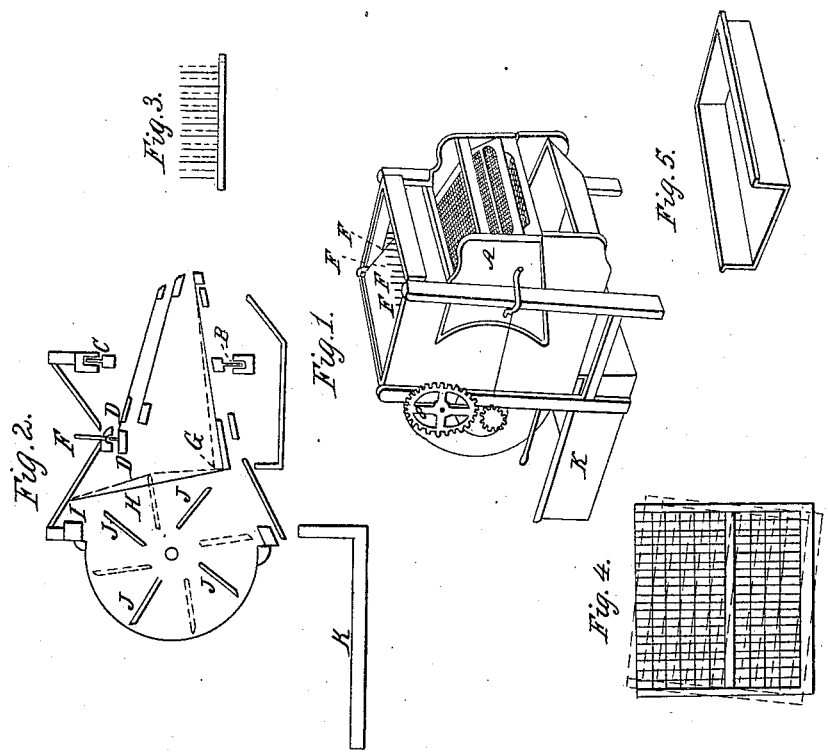
Witnesses:
Joseph Kelly
Amon Pederser
Inventors:
Henry Kelly
Wm Franklin

UNITED STATES PATENT OFFICE.

WILLIAM FRANKLIN AND HENRY KELLY, OF DECORAH, IOWA.

IMPROVEMENT IN FANNING-MILLS.

Specification forming part of Letters Patent No. 40,937, dated December 15, 1863.

*To all whom it may concern:*

Be it known that we, WILLIAM FRANKLIN and HENRY KELLY, of Decorah, in the county of Winnesheik and State of Iowa, have invented a new and useful Improvement on the Fanning-Mill; and we do hereby declare that the following is a full, clear, and exact description of the construction and operation of the same, reference being had to the annexed drawings, making a part of this specification, in which—

Figure 1 is a perspective view; Fig. 2, a transverse section. Figs. 3, 4, and 5 are detached parts.

Our improvement consists—

First. In resting the shoe A, Fig. 1, on a single point or pivot, B, Fig. 2, in or near the center of said shoe, on which pivot the shoe vibrates, while the upper part of the shoe is held in its place by a similar pivot, C, Fig. 2, thereby allowing the shoe to vibrate with the least possible amount of friction, while the centrifugal force of this peculiar vibration (shown at Fig. 4) tends to keep the grain spread on the sieve.

Second. On the part of the shoe that extends under the aperture in the hopper, through which the grain passes, D D, Fig. 2, we fasten a row of metal or wooden pins, F, Fig. 2, extending up through said aperture and into the hopper, as shown at F F F F, Fig. 1. These pins, being fastened to the shoe, vibrate in the manner shown by Fig. 3, and thus keep the grain in continual motion, causing it to pass through the aperture in the hopper continuously and evenly to the sieve.

Third. From the front end of the screen G to the under side of the hopper I we fasten a strap, H, in such a position that the blades of the fan J J J J in revolving will strike it, pushing it forward, and thus suddenly raising the front end of the screen and keeping it in continual motion, thereby keeping the screen from becoming clogged by small grains of wheat, cockle, &c., that are liable to lodge in the meshes of said screen.

Fourth. Under the mill we have a draw or reservoir, Fig. 5, (which, when in use, is drawn out, K, Fig. 1,) into which draw or reservoir the clean grain falls after passing through the mill. By this arrangement the grain is not allowed to scatter over the floor on which the mill rests while in operation, thus preserving the grain from being mixed with impurities and from being wasted. This is especially useful to farmers in the West, where so few have barns, and are consequently obliged to clean their grain in the open field.

What we claim as our invention, and desire to secure by Letters Patent, is—

1. The shoe vibrating on a single central vertical pivot, B, or its equivalent, as and for the purposes described.

2. The strap H, or its equivalent, as and for the purposes described.

WM. FRANKLIN.
HENRY KELLY.

Witnesses:
CYRUS McKAY,
N. J. ATWOOD.